March 30, 1971 J. R. KAELIN 3,573,203
METHOD AND APPARATUS FOR SEWAGE TREATMENT
Filed Sept. 17, 1968
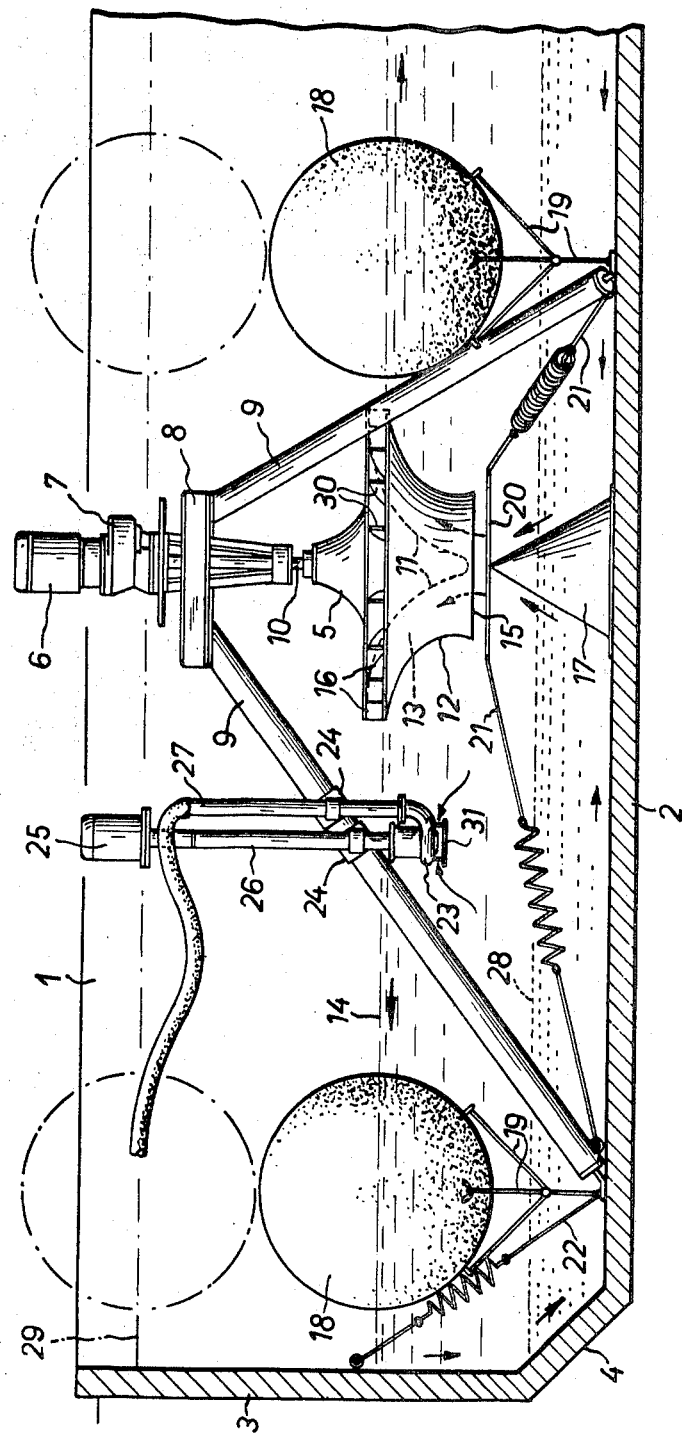
INVENTOR.
JOSEPH RICHARD KAELIN
BY Mcglew and Toren
ATTORNEYS

United States Patent Office 3,573,203
Patented Mar. 30, 1971

3,573,203
METHOD AND APPARATUS FOR SEWAGE TREATMENT
Joseph Richard Kaelin, Villa Seeburg,
Buochs, Nidwalden, Switzerland
Filed Sept. 17, 1968, Ser. No. 760,282
Int. Cl. C02c 1/10
U.S. Cl. 210—14                                     5 Claims

ABSTRACT OF THE DISCLOSURE

A sewage treatment system comprises a tank containing sewage to be aerated and circulated by an aeration rotor partially immerged in the liquid contained in the tank. The aerator is suspended from a floating system which is floating on the liquid in the tank, so that the aerator can move up and down with the varying liquid level in the tank. At certain periods, as for example during the night when no sewage is supplied, the aerator is stopped so that sludge is allowed to settle to the bottom of the tank and clarified liquid can be withdrawn from the upper portion of the tank, while at daybreak when sewage begins to accumulate, the aerator is operated to diffuse atmospheric oxygen in the liquid in the tank and activate the sludge contained therein.

---

This invention relates to a method and apparatus for sewage treatment.

In the treatment of sewage according to the activated sludge process, the liquid to be treated usually flows through a preliminary clarification tank, then through an aeration tank in which oxygen from the air is introduced into the liquid, by means of an aerator wheel for aerating and circulating the liquid in the tank, and afterwards into a final clarification tank where the sludge settles to the bottom and clarified liquid remains on the top.

The object of the present invention is to provide a method for sewage treatment which results in a simplification of the clarification technique.

According to the invention a single tank is used for the treatment of sewage, and a rotatable aeration wheel floating in the liquid to be treated is intermittently operated and shut down to thereby aerate and circulate the liquid in the tank for a period of time, and after shutting down rotation of the aerator wheel, permitting the sludge to settle and clarified liquid to be withdrawn from the tank, and then again the tank is filled with sewage to be treated and the aerator wheel is operated.

The sewage, accordingly, is treated in a single tank which is used as buffer tank, aeration and circulation tank and also as final clarification tank. During the supply of sewage to the tank the liquid level in the tank rises, the aeration wheel operates to diffuse air into the liquid in the tank and to hold the sludge in suspension in the body of liquid.

In carrying out this method of treatment of sewage in a single tank, the tank is filled with sewage to be treated, the sewage is aerated and circulated in the tank by rotation of said aerator wheel, after a predetermined period of time operation of the aerator wheel is stopped to permit settling of the sludge in the liquid at rest to the bottom of the tank, after such settling the clarified water is withdrawn from the upper portion of the tank while the floating aerator wheel moves downwardly in the tank together with the dropping liquid surface until a predetermined liquid level in the tank has been attained, and afterwards the supply of sewage to the tank and operation of the aerator wheel are re-established to thereby raise the liquid level in the tank and again aerate and circulate the liquid in the tank.

At certain periods when no sewage collects, as for example at night, the aeration wheel is stopped so that the liquid in the tank does no longer circulate and the activated sludge settles to the bottom of the tank. After a certain period of time when the sludge has settled, a zone of clarified liquid has formed in the upper portion of the liquid in the tank. This purified liquid can be withdrawn from this clarification zone, for example by a pump which conveniently will be mounted on the floating system carrying the aeration wheel in the tank. After withdrawal of the clear water from the clarification zone, the supply of sewage to the tank is re-established, the aeration wheel is started again, aeration and circulation is continued and the activated sludge held in suspension in the liquid in the tank.

In a sewage treatment plant using the described method, it is possible, during the night when the supply of sewage is small or ceases entirely, to withdraw purified water two or three times from the clarification zone, the floating system then lowering together with the dropping liquid surface in the tank until a predetermined level. In the morning, when the supply of sewage starts and the liquid level in the tank rises, the aeration wheel is started and operates all day long until the tank is filled. In the evening the aeration wheel is stopped again and settling of the sludge can take place.

The accompanying drawing represents an example of a sewage treatment plant for carrying out the method according to the invention.

The single figure of the drawing represents a fragmentary vertical section through an aeration tank which can be of circular, rectangular or square section, and which contains a floating aeration apparatus capable of moving up and down with the varying liquid level in the tank.

Referring to the drawing, the tank 1 comprises a horizontal bottom 2 and a vertical lateral wall 3. A beveled wall portion 4 is situated between the side wall and the bottom wall. An aerating rotor 5 is arranged in the tank 1 and is driven by an electric motor 6 and gear 7. Motor and gear are mounted on a supporting plate 8 provided with a central opening traversed by the rotorshaft 10. Three oblique supporting posts 9 directed downwardly and radially outwards are fixed to the plate 8. The rotor 5 is suspended on the shaft 10. The rotor may be of any conventional design. Preferably, an aerator as described in my copending patent application Ser. No. 434,838, now abandoned, will be used. In the represented example the rotor comprises a plurality of substantially radial blades 30 which extend between and form together with annular upper or inner and lower or outer shrouds 11 and 12 guide channels 13 for the liquid to be aerated. In operation the rotor 5 occupies the represented position with respect to the liquid level 14 in the tank. The lower portion of the rotor with the inlet openings 15 of the guide channels 13 is submerged into the liquid. When the rotor turns, the liquid within the guide channels subjected to centrifugal force is raised in the channels and discharged through the horizontally and radially directed outlets 16 situated on the height of the liquid level 14 in the tank. A suction is thereby caused at the inlets 15 to the guide channels, drawing liquid continuously from below into the guide channels and discharging the liquid in horizontal direction through the outlets 16. As long as the rotor operates there will be a continuous circulation of liquid passing through the guide channels 13 of the rotor. Due to rotation of the partly submerged rotor, the whole content of the tank will gradually obtain a rotational movement having the same direction of rotation as the rotor 5 but moving slower. The liquid which is discharged from the rotor 5 in horizontal direction over the level 14 in the tank spreads radially over the liquid surface in the tank towards the side wall 3 and hence is deflected downwards and by the beveled wall section 4 radially inwards again along the bottom of the tank towards a fixed flow cone 17 which deflects the liquid upwards and into the region of suction created by the turning rotor 5, where the liquid again enters the guide channels 13. When the liquid is discharged from the outlets 16 of the rotor guide channels, it is mixed with air which thus is diffused in the liquid body in the tank.

In the represented position, the rotor 5 occupies its lowermost position in the tank 1. The supporting posts 9 are resting with their bottom ends on the tank bottom 2. At the lower end portion of each post is attached a floating body 18 by means of flexible connecting members 19. These floating bodies preferably consist of a hollow sphere of polyester material which is filled with a synthetic foam material. The buoyancy of the floating bodies 18 is such as to maintain the entire aerating apparatus, consisting of rotor 5, motor 6, gear 7, supporting plate 8 and posts 9 in floating condition in the liquid body in the tank and on such a level, that the lower edge of the outlets 16 of the guide channels 13 of the rotor approximately is situated flush with the surface 14 of the liquid, as is represented in the drawing. The aeration apparatus as a whole accordingly moves upwardly and downwardly in accordance with the liquid level in the tank.

In order that the aeration apparatus does not move in lateral direction in the tank transversely to its axis but is retained in an axially defined position in alignment with the axis of the flow cone 17, flexible anchoring means are provided. Horizontal rods 20 are secured to the apex of the cone 17, and are connected by flexible, elastic means 21 with the ends of the posts 9. Instead of the flexible means 20 and 21 or in addition thereto, further elastic connecting means 22 can be provided for anchoring the ends of the posts 9 on the side wall 3 of the tank. In this manner the aeration rotor together with the posts 9 can rise and lower together with the liquid level in the tank, the outlet openings 16 of the rotor retaining their position with respect to the liquid level 14, and the rotor axis remaining continuously aligned with the axis of the cone 17.

A pump 23 is attached to one of the posts 9 by means of clamping rings 24. The pump is driven by means of a motor 25. The driving shaft extends within a tube 26 to the pump rotor immersed in the liquid in the tank. The delivery conduit 27 of the pump leads upwardly and out of the tank.

The described sewage treatment apparatus operates in the following manner: In the drawing the aeration device is represented in its lowermost position in the tank; the ends of the posts 9 rest on the bottom of the tank. The rotor 5 is shut down and does not turn, while the pump 23 is operating and draws clarified liquid through its intake 31. This position is assumed by the aeration device for example at the ending night. The sludge has settled into the zone between the bottom 2 of the tank and a level 28, while above this level there is a clarification zone from which purified water is withdrawn by the pump 23 and for example delivered into the main canal of the sewage system by the delivery conduit 27. The level of the clean water can still drop slightly further than the represented level 14, but must not be lowered so far that the zone of the settled sludge below the line 28 is disturbed. At daybreak the pump 23 is shut down and feeding of sewage into the tank begins. The rotor 5 is started and causes the aeration and circulation of the liquid in the tank, while the activated sludge is held in suspension. Towards the evening the liquid level in the tank has reached its maximum 29. The floating bodies 18 will be situated in the position shown in dash and dot lines and maintain the aeration rotor 5 floating in a central position above the cone 17 with the outlets 16 of the guide channels 13 remaining always on the raising liquid level 14. In the evening when the supply of sewage stops, the motor 5 is shut down, the circulation of the liquid in the tank ceases, the activated sludge settles from the stagnant liquid to the bottom of the tank and a clarification zone forms in the upper portion of the liquid body. After a certain period of time, the pump 23 is started and clear water is drawn off through the delivery tube 27. The liquid level in the tank drops gradually to the indicated level 14, together with the floating system and the aerator until the posts 9 rest on the tank bottom 2. Now the pump is shut down again. The supply of sewage into the tank will be re-established, the rotor will be switched on and a new cycle including circulation of the contents of the tank, diffusion of air into the liquid, stopping the rotor 5 and settling of the sludge can start.

In sewage treatment plants which normally use a rain water clarification basin, or in greater plants having a continuous and considerable afflux of sewage, two or more of the described activating tanks can be used which would operate in phase displacement. While one of the tanks aerates its content with the aerator running, the second tank will be in the sludge settling phase. The two tanks thus can be used as rain water clarification basin and as buffer basin.

The control of the motors 6 and 25 of the aerator rotor 5 and the pump 23, respectively can be effected automatically, for example electronically, so that the switching times for the rotor, the sedimentation or settling and the withdrawal of the clear liquid are effected automatically.

According to the described method, the buffering of the supply of sewage, aeration of the sewage and final clarification are combined in a single tank, resulting in considerable advantages in respect of structure and operation.

I claim:

1. A method for treatment of sewage according to the activated sludge process in an aeration tank, which comprises the steps of intermittently operating and shutting down a rotatable aeration device floating in the liquid to be treated in said tank to thereby aerate and circulate the liquid in the tank for a period of time, filling said tank with sewage to be treated, aerating and circulating the sewage in said tank by operating said aeration device, interrupting the supply of sewage to said tank, stopping said aeration device after a predetermined period of operation to permit settling of the sludge to the bottom of said tank and forming of a zone of clarified liquid in the upper portion of the tank, withdrawing said clarified liquid from the tank whereby said floating aerator device moves downwardly together with the dropping liquid surface in the tank until a predetermined level is reached, and then again opening the supply of sewage to said tank thereby raising the liquid level in the tank and said aeration device, and starting operation of the aeration device to again aerate and circulate the liquid in the tank.

2. A method according to claim 1, in which two aeration tanks comprising each a floating aeration device are used, said two tanks being operated at displaced phases in such manner that upon operation of the aeration device in one of the tanks, the sludge is settling in the other tank or clarified liquid is withdrawn therefrom.

3. Apparatus for treatment of sewage comprising a tank adapted to contain a body of liquid, an aeration rotor positioned within said tank for aerating and circulating said body of liquid in the tank and arranged to be partially submerged within the body of liquid therein, a floating system arranged to float on the body of liquid in said tank, a pump carried by said floating system for withdrawing liquid from the upper portion of said tank, said aeration rotor being suspended on said floating system whereby said rotor is raised and lowered in said tank according to the level of said liquid body in the tank and means for limiting the lowering movement of said rotor in the tank.

4. Apparatus according to claim 3, in which said pump is adjustably mounted on the floating system for varying the depth of immersion of the pump intake into said liquid body in the tank.

5. Apparatus according to claim 3, in which said aeration rotor is adapted to rotate about a vertical axis, a driving motor for said aeration rotor being carried by said floating system, said floating system including a supporting plate arranged above the liquid level in the tank to support said driving motor, supporting posts secured to said plate extending to the liquid body in the tank, and floating bodies being attached to said posts, said floating bodies maintaining said plate and said aeration rotor at a constant height until respect to the level of the liquid body in the tank, said pump is movably mounted on one of said supporting posts for adjusting its position thereon longitudinally of said supporting post.

References Cited

UNITED STATES PATENTS

| | | | |
|---|---|---|---|
| 3,154,601 | 10/1964 | Kalinske et al. | 210—221X |
| 3,218,042 | 11/1965 | Ciabattari et al. | 210—15X |
| 3,327,855 | 6/1967 | Watson et al. | 210—220X |
| 3,470,092 | 9/1969 | Bernard | 210—220X |

MICHAEL ROGERS, Primary Examiner

U.S. Cl. X.R.

210—219, 242; 261—91, 120